United States Patent
Yamaguchi

(10) Patent No.: US 6,441,807 B1
(45) Date of Patent: Aug. 27, 2002

(54) DISPLAY SYSTEM

(75) Inventor: Hidehiko Yamaguchi, Chiba (JP)

(73) Assignee: Plus Industrial Corporation, Iruma (JP)

( * ) Notice: Subject to any disclaimer, the term of this patent is extended or adjusted under 35 U.S.C. 154(b) by 0 days.

(21) Appl. No.: 09/297,558

(22) PCT Filed: Sep. 3, 1998

(86) PCT No.: PCT/JP98/03961
§ 371 (c)(1),
(2), (4) Date: May 3, 1999

(87) PCT Pub. No.: WO99/11473
PCT Pub. Date: Mar. 11, 1999

(30) Foreign Application Priority Data

Sep. 3, 1997 (JP) .............................................. 9-238120

(51) Int. Cl.$^7$ ................................................. G09G 5/00
(52) U.S. Cl. ........................ 345/173; 345/156; 345/172; 345/174; 345/179; 345/178; 178/18.01; 178/18.03; 178/18.05
(58) Field of Search ................................ 345/173, 179, 345/172, 174, 156, 178; 178/18.09, 18.01, 18.03, 18.05

(56) References Cited

U.S. PATENT DOCUMENTS

| | | | | |
|---|---|---|---|---|
| 5,790,114 A | * | 8/1998 | Geaghan et al. | 345/179 |
| D401,614 S | * | 11/1998 | Moriyama | D18/36 |
| 5,869,789 A | * | 2/1999 | Reid-Green | 178/18.01 |
| 5,943,044 A | * | 8/1999 | Martinelli et al. | 345/174 |
| 6,100,877 A | * | 8/2000 | Chery et al. | 345/178 |
| 6,124,845 A | * | 9/2000 | Toda et al. | 345/157 |

FOREIGN PATENT DOCUMENTS

| | | |
|---|---|---|
| JP | 61-30164 A | 2/1986 |
| JP | 1-94423 A | 4/1989 |

OTHER PUBLICATIONS

Microfilm of the specification and drawings annexed to the request of Japanese Utility Model Application No. 63422/1985 (Laid–open No. 180778/1986) (Sharp Corp.), Nov. 11, 1986. Full text, Figs. 1 to 7.

Microfilm of the specification and drawings annexed to the request of Japanese Utility Model Application No. 117753/1983 (Laid–open No. 25045/1985) (Yugen Kaisha Niiya Seisakushi) Feb. 20, 1985, p. 1, lines 12 to 14; p. 2, line 19 to p. 3, line 12; p. 5, lines 6 to 8; Fig. 1.

Microfilm of the specification and drawings annexed to the request of Japanese Utility Model Application No. 47652/1989 (Laid–open No. 139796/1990) (Teijin Ltd.), Nov. 21, 1990, Full text Figs. 1 to 3.

* cited by examiner

*Primary Examiner*—Richard Hjerpe
*Assistant Examiner*—Ali Zamani

(57) ABSTRACT

A display system includes a sheet member onto which information is input, and a position coordinate detector such as a pressure sensitive touch panel. The position coordinate detector is formed as a body separate from the sheet member and is arranged behind the sheet member. It detects the position of information input on the sheet member. A computer, to which the output data of the position coordinate detector is transferred, processes the information input to the sheet member. When the sheet member is used as a projection screen, the computer connects to a projector to project the input information onto the sheet member.

23 Claims, 16 Drawing Sheets

DISPLAY SYSTEM

This application is the national phase under 35 U.S.C. §371 of PCT International Application No. PCT/JP98/03961 which has an International filing date of Sep. 3, 1998, which designated the United States of America.

TECHNICAL FIELD

The present invention relates to an electronic-blackboard type display system which transfers information, written onto an information input surface of a sheet member with a marker pen, to a controller such as a personal computer substantially concurrently with the writing of the information to present the information on a monitor. The information is stored in a memory, and the information is printed out on a printer. The present invention also relates to a display system which transfers information, input through pressure with an inkless pressure pen on the sheet member used as a projection screen, to the controller while projecting the input information on the screen through a projector connected to the controller.

BACKGROUND ART

FIG. 15 shows a conventional electronic blackboard display system that transfers information, written with a marker pen as a writing and pressuring instrument, to a personal computer to display, and stores and prints out the information.

Referring to FIG. 15, a pressure input unit 101 with a writing and erasing function is designated 101, and is constructed as shown in more detail in FIG. 16. Specifically, the pressure input unit 101 is composed of a top sheet 101A, an insulating frame 101B, a bottom sheet 101C, and a reinforcement board 101D.

The top sheet 101A is constructed of a plastic film that is surface treated to enable a marker pen to write and erase information thereon, and the rear surface of the plastic film is coated with a carbon resistor film. The bottom sheet 101C is constructed of a plastic film as a base material, and the surface of the plastic film is coated with a carbon resistor film. The pressure input unit 101 is constructed by gluing the two plastic sheets 101A and 101C together with the insulating frame 101B interposed therebetween, and by gluing the reinforcement board 101D to the bottom sheet 101C from its rear side.

The marker pen writes on and presses the top sheet 101, causing the carbon resistor film of the top sheet 101 beneath the pressed portion to connect to the carbon resistor film of the bottom sheet 101C, thereby providing position data corresponding to the position of the pressed portion. The pressure input unit 101 is called a resistor film, pressure sensitive touch panel as one type of position coordinate detecting means.

When a character or the like is written on the top sheet 101 of the pressure input unit 101 constituting the position coordinate detecting means, already described in FIG. 15, using a marker pen, the position data produced at the pressed portion is converted into digital data by position data converter 102. The digital data, as written information, is successively transmitted to a personal computer 104 via data transfer device 103.

The personal computer 104 presents the written information on a monitor, and stores it in a memory, and prints outs it on a printer as necessary.

In this system, the visible information written on the pressure input unit 101 is presented, stored and printed on the personal computer 104 substantially on a real-time basis, and may be furthermore transmitted to a remote place.

FIG. 17 shows a conventional projection system in which the handwriting stroke information, created by a pressure pen on a screen, is transmitted to a computer so that the handwriting stroke information is projected on a projection screen by a projector.

In this conventional art, a screen 105A is integrally formed with a pressure input unit 105, on which no inked information is written by a marker pen. Specifically, the screen 105A is constructed of a material on which a projector 106 can project a video. Any material is acceptable as long as it transfers a pressure, applied by a pressure pen, to position coordinate detecting means (not shown) of the pressure input unit 105. The position coordinate detecting means on the pressure input unit 105 can be constructed of a resistor film and pressure sensitive touch panel, for example, like the above-described pressure input unit 101.

FIG. 17 shows a conventional projection system in which the handwriting stroke information, created by a pressure pen on a screen, is transmitted to a computer so that the handwriting stroke information is projected on a projection screen by a projector.

In this conventional art, a screen 105A is integrally formed with a pressure input unit 105, on which no inked information is written by a marker pen. Specifically, the screen 105A is constructed of a material on which a projector 106 can project a video. Any material is acceptable as long as it transfers a pressure, applied by a pressure pen, to position coordinate detecting means (not shown) of the pressure input unit 105. The position coordinate detecting means on the pressure input unit 105 can be constructed of a resistor film and pressure sensitive touch panel, for example, like the above-described pressure input unit 101.

The operation of this projection system is generally discussed. When a character or the like is written on the screen 105A of the pressure input unit 105 constituting the position coordinate detecting means, using a pressure pen, the position data produced at the pressed portion is converted into digital data by position data converter 102 in the same manner as in the preceding system. The digital data, as written information, is successively transmitted to a personal computer 104 via data transfer device 103.

A personal computer 104 presents the written information on its monitor while transmitting it to a projector apparatus 106 constructed of a liquid-crystal projector to present the information on a screen 105A.

The written information is projected exactly in the same strokes along which the pressure pen moves on the screen 105A. This gives an impression that the information is actually written on the screen.

The above conventional display system is very useful in a video teleconference system or the like, because the written information and handwriting stroke information are transferred to the personal computer 104 substantially on a real-time basis.

In the electronic blackboard such as the one shown in FIG. 15, only one surface on the top sheet 101 serves as an information input surface. To proceed with a conference further after transferring the information written on the input surface to the personal computer 104 for storage, the information written on the top sheet 101 needs to be erased. Conference participants may want to return to a previous issue after the erasing of the information, but no means is available to reproduce the written information stored in the personal computer 104 on the pressure input unit 101 (top sheet 101A). This inconveniences users very much.

Since the ability to fully diffuse light is required of the screen 105A in the projector system shown in FIG. 17, the top sheet 101 provided with the write and erase functions only, shown in FIG. 15, is not employed, as is, for the screen 105A.

Since the screen 105A itself constitutes the position coordinate detecting means as shown in FIG. 17, the black color of the carbon resistor film coating on the rear surface thereof is seen through from the front. Viewers may find it uncomfortable. If the screen 105A is thickened to eliminate such a drawback, more force is required to use a pressure pen in handwriting. This inconveniences users in handwriting.

SUMMARY OF THE INVENTION

It is an object of the present invention to provide a display system which prevents the resistor film of the position coordinate detecting means from being seen through from the front of the sheet member to free the viewers from the irritation of the black carbon resistor film.

It is another object of the present invention to provide a practical display system that is equipped with a sheet member having a plurality of information input surfaces.

It is yet another object of the present invention to provide an easy-to-use display system that is useful for video teleconference.

Instead of the top sheet 101A or screen 105A, which is integrated with the position coordinate detecting means to form the conventional pressure input unit 101 or 105, the present invention employs a sheet member 20 that is formed of a body separate from position coordinate detecting means 10 as shown in FIG. 1.

The sheet member may be equipped with a single information input surface as shown in FIG. 1. Preferably, a plurality of sheet members 21 and 22 are employed by interchanging one with another as shown in FIG. 2. Alternatively, an elongated sheet member 23 having a plurality of information input surfaces 23a on the same plane is movably supported on the position coordinate detecting means 10 as shown in FIG. 3. Alternatively, an endless sheet member 24 having information input surfaces 24a on both front side and back side, is entrained about a pair of rollers 26 as shown in FIG. 24. The information input surfaces 24a are switched as the rollers 26 rotate.

Referring to FIG. 5, an elongated sheet member 25 having a plurality of information input surfaces is supported between a pair of rollers 26, with one end paid out by one roller 26 and the other end wound up by the other roller 26. As the rollers 26 rotate, a new information input surface is provided.

In the examples shown in FIGS. 4 and 5, the pair of rollers 26 are horizontally movable to give a constant tension to the sheet members 24 and 25. In any case, the sheet members 21–25 shown in FIG. 2–FIG. 5 have respectively a plurality of information input surfaces.

The sheet members 20–25 may be of either one type that is surface-treated to permit a marker pen to be used for writing and erasing as in the electronic blackboard 101A shown in FIG. 15, or the other type that permits a projector to project a video as in the screen 105A shown in FIG. 17.

In the sheet members 21–25, each sheet member is preferably partitioned to that one of the plurality of information input surfaces has a writing and erasing function, and the other of the information input surfaces is a screen on which a video is projected.

The present invention includes any of the sheet members 20–25, the position coordinate detecting means 10 separate from the sheet members 20–25, and control means such as a personal computer for example, for storing, displaying and printing information input to the sheet members 20–25 when output data is transferred thereto.

In accordance with the sheet members 21–25 having the plurality of information input surfaces, the personal computer 104, as the control means for example; for storing, displaying and printing the input information as shown in FIG. 6, has a memory 104a. The memory 104a has a plurality of input information memory areas 104b corresponding to the plurality of information input surfaces (the plurality of screens).

In the display system thus constructed, information is input onto one surface of the sheet members 21–25, and the input information is transferred to be stored in the storage area 104b in the personal computer 104. To go to next proceedings in the conference, the sheet members 21–25 are interchanged or moved to allow another information input surface to appear on the position coordinate detecting means 10 for new information input. The information newly input is stored in another memory area 104b in the personal computer 104.

When conference participant want to return to a previous issue in the middle of the next proceedings to confirm the content of the screen for the previous proceedings, the previous information input surface is put on display and the written information, as it is, remains thereon. When the sheet members 21–25 are projection screens, the data, stored in the memory area 104b, is retrieved to project the image of the data onto the projection screen.

The written information or projected image on the sheet members 21–25 and the display content on the monitor based on the data in the memory area 104b in the personal computer 104 coincide with each other. Information newly added to the information input surface is also additionally stored in the memory area .104b while being presented on the monitor at the same time.

Since the sheet members 21–25 are separately arranged from the position coordinate detecting means 10 in the present invention, there is provided a slight gap therebetween. The slight gap makes the black color of the resistor film of the position coordinate detecting means 10 less visible from the front side. This makes it unnecessary to thicken the sheet members 20–25.

If the position coordinate detecting means 10 has a two-layered structure constructed of a top sheet and a bottom sheet, the two sheets connect to each other with an air layer held therebetween. With this arrangement, the thickness of the sheet is thinned, compared with one sheet member as thick as two sheets.

The present invention is summarized as follows.

The present invention includes a sheet member to which information is input, position coordinate detecting means which is formed as a body separate from the sheet member and is arranged behind the sheet member and detects the position of information input on the sheet member, and control means, to which the output data of the position coordinate detecting means is transferred and which processes the information input to the sheet member.

The present invention includes a display system, wherein the position coordinate detecting means detects, as the position of information input, a position where a pressure is applied on the sheet member.

The present invention includes a display system, wherein the position coordinate detecting means includes a resistor film type, pressure sensitive touch panel.

The present invention includes a display system, wherein the sheet member includes a plurality of information input surfaces.

The present invention includes a display system, wherein the sheet member includes a writing sheet onto which a writing and pressure pen writes information, which can also be erased.

The present invention includes a display system, wherein the sheet member includes a screen onto which a pressure pen inputs information and onto which an image, based on the output data of the position coordinate detecting means, is projected.

The present invention includes a display system, wherein the sheet member includes an information input surface, as a writing sheet, onto which a writing and pressure pen writes information which can be erased; and an information input surface, as a screen onto which an image, based on the output data of the position coordinate detecting means, is projected.

The present invention includes a display system, wherein the control means includes a plurality of memory areas corresponding to a plurality of information input surfaces of the sheet member.

The present invention includes a display system, wherein the control means includes a display system, which includes position data converter for converting the output data of the position coordinate detecting means into digital position coordinate data, and a data transfer device for transferring the output data of the position data converter to the control means.

The present invention includes a display system, which includes optical reader for optically reading information written on the sheet member, a data converter for converting the output data of the optical reader into digital data, and a data transfer device for transferring the output data converter to the control means.

DETAILED DESCRIPTION OF THE PREFERRED EMBODIMENTS

To clarify the present invention, the embodiments of the present invention are now discussed referring to the accompanying drawings.

Figure 7:
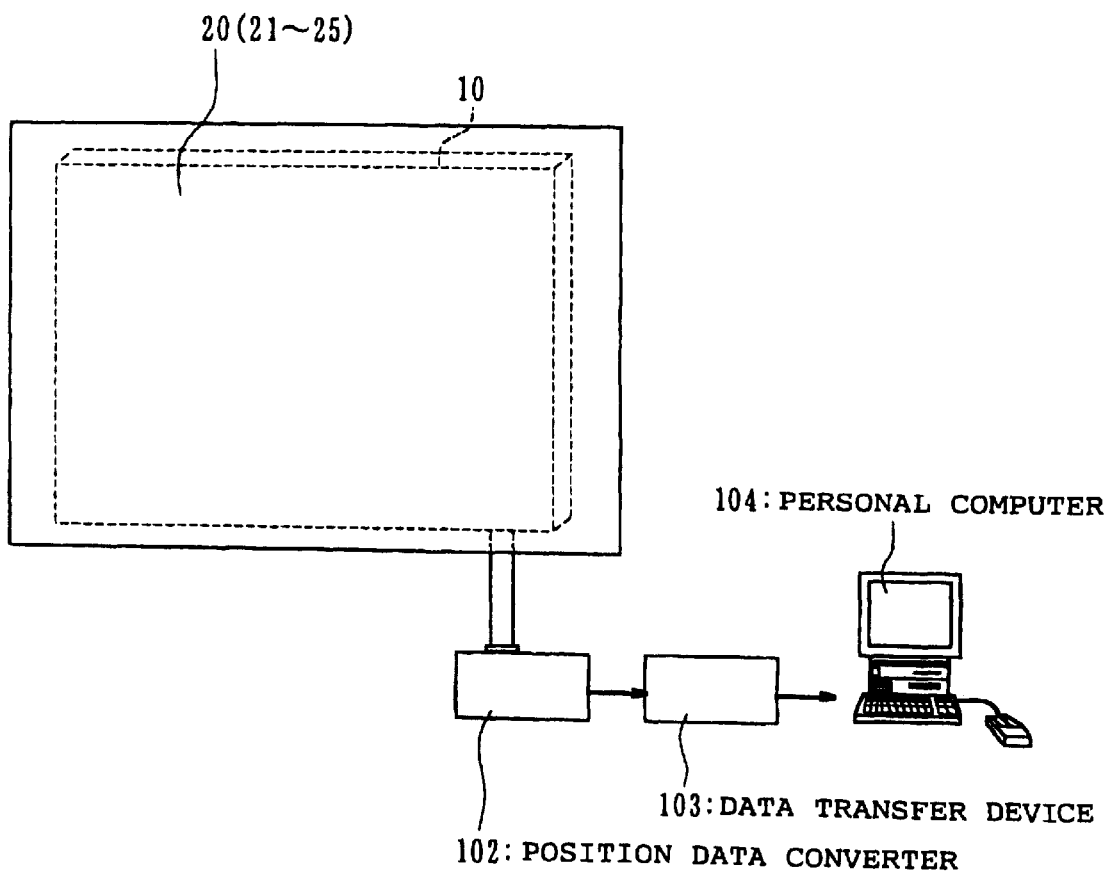
FIG. 7 is a block diagram showing a first embodiment of the present invention.

FIG. 7 is a block diagram showing a first embodiment of the present invention, and like reference numerals are used to designate identical elements.

Referring to FIG. 7, there is shown a sheet member 20 having a single information input surface. Alternatively, sheet members 21–25 having a plurality of information input surfaces may be employed.

Figure 15:
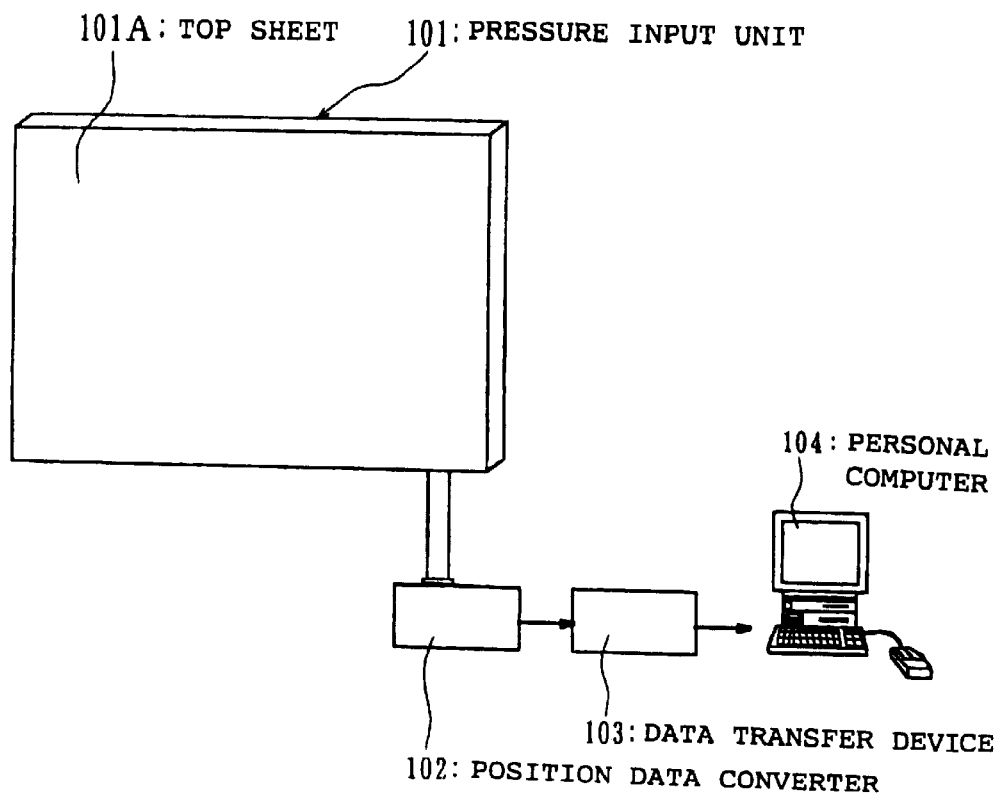
FIG. 15 is a block diagram of a conventional art.
Figure 16:
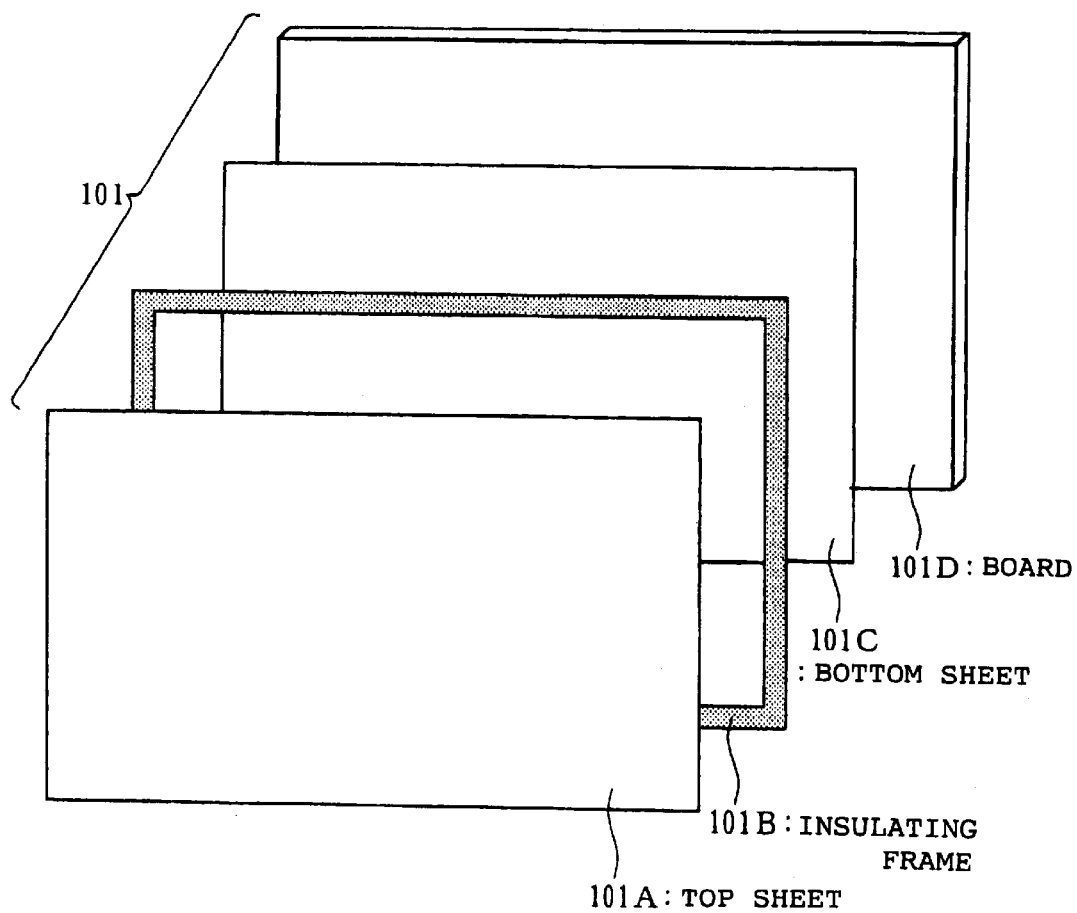
FIG. 16 is a diagram of position coordinate detecting means of the conventional art shown in FIG. 15.

This system is one type of electronic blackboard, and generally corresponds to the display system shown in FIG. 15.

Position coordinate detecting means 10, formed as a separate body and arranged behind the sheet member 20, is connected to position data converter 102. The position data converter 102 connects, via data transfer device 103, to a personal computer 104 as control means.

The sheet member 20 is constructed of a polyester film, as thick as about 100 $\mu$m, as a base material. The polyester film has an acrylic coating thereon so that a marker pen having the function of writing and pressure pen writes information which can be easily erased, on the acrylic coated polyester film. The marker pen writes information on the sheet member 20 while applying pressure on the sheet member 20. The position coordinate detecting means 10 provides position data, as an electric signal, corresponding to the coordinates right beneath a pressed portion of the sheet member 20. The position data is sent to the position data converter 102. The position data converter 102 converts the data into digital data, and is successively transmitted, as written information, to the personal computer 104 via the data transfer device 103. The personal computer 104 presents the written information on a monitor, stores the written information in a memory, and, as required, prints out the written information on a printer.

The visible information written on the sheet member 20 is presented and stored on the personal computer 104 almost on a real time basis, and is further transmitted to a remote place for conference or other purposes.

In the above arrangement, the position coordinate detecting means 10 may be constructed of a resistor film type, pressure sensitive touch panel, for example.

Figure 8:
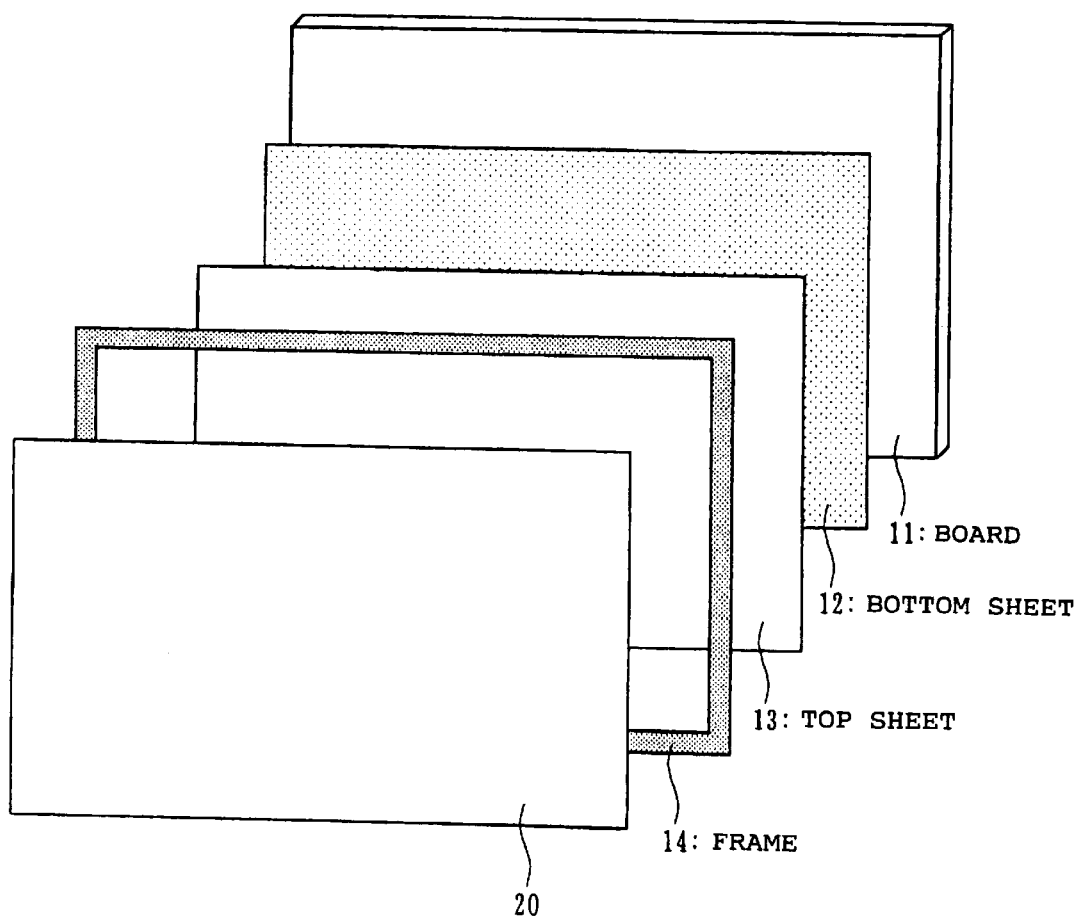
FIG. 8 is a diagram showing the position coordinate detecting means of the first embodiment.

FIG. 8 shows the structure of the position coordinate detecting means 10. A bottom sheet 12, a top sheet 13, a frame 14, and the sheet member 20 are laminated in that order on a flat reinforcement board 11 as thick as about 15 mm and of a size larger than that of the information input surface of the sheet member 20.

The frame 14 is glued onto the periphery of the rear side of the sheet member 20 to make a unitary structure, which is detachably mounted on the top sheet 13.

Figure 9:
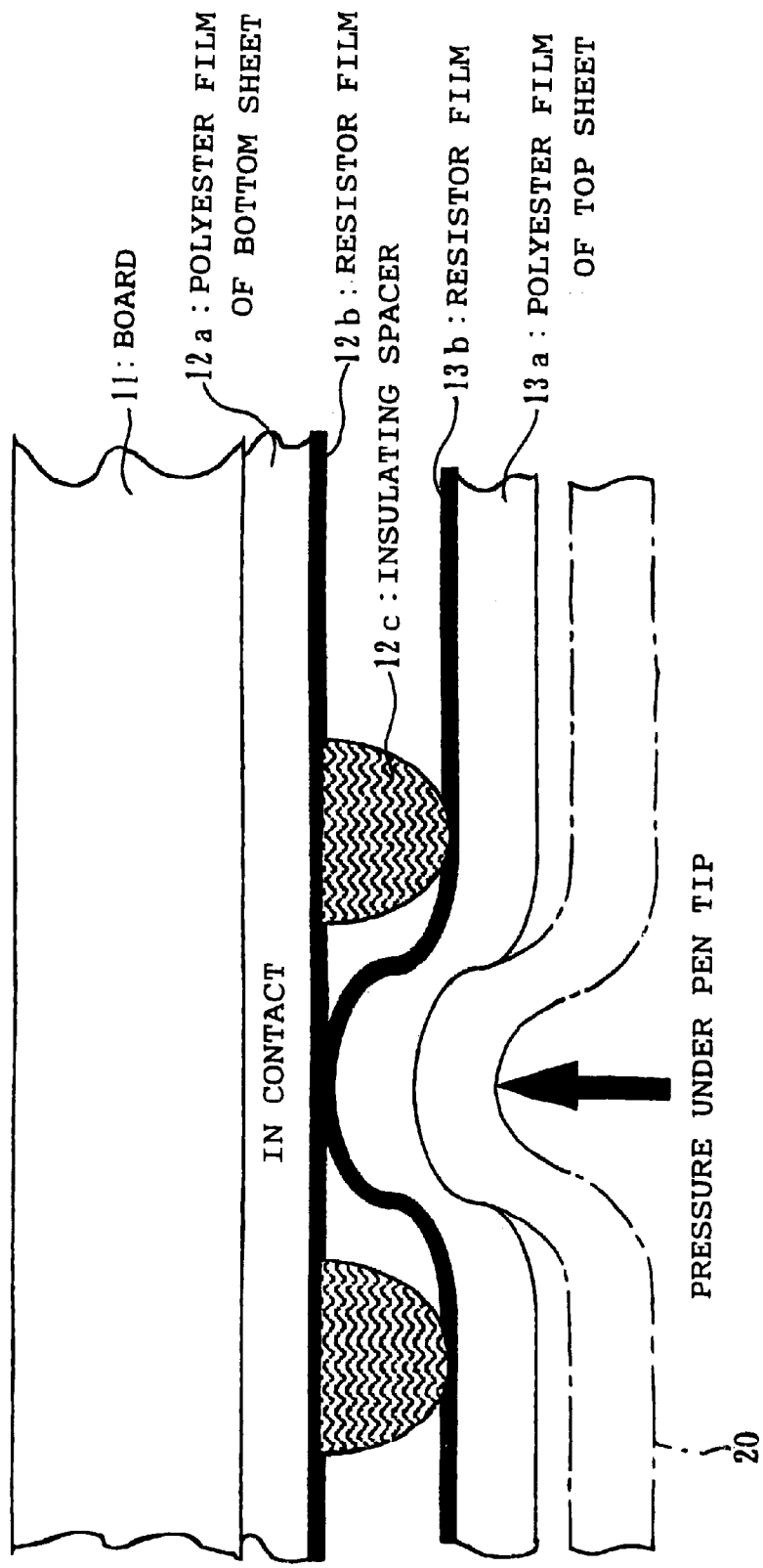
FIG. 9 is a partial, enlarged view of the position coordinate detecting means of the first embodiment.

As shown in FIG. 9, the bottom sheet 12 is preferably constructed by coating a polyester film 12a, as a base material, with an electrically conductive resistor film 12b, and printing insulating ink dots on the surface of the resistor-film coated film to fix an insulating spacer 12c on the resistor-film coated film.

On the other hand, the top sheet 13 is constructed by coating the rear surface of a polyester film 13a, as a base material, with an electrically conductive, resistor film 13b, and the sheets 12 and 13 are laminated so that their respective resistor films 12b and 13b face each other with a gap held therebetween by the insulating spacers 12c.

Since the writing and erasing operations are performed on the sheet member 20, the surface of the top sheet 13 is not required to have the writing and erasing capability by the marker pen. The top sheet 13 is processed for anti-static features.

Each of the insulating spacers 12c is formed of insulating ink and has a diameter of approximately 300 μm and a height of approximately 30 μm, and the insulating spacers 12c are spaced apart with a pitch of about 3 mm.

When the marker pen presses the top sheet 13 via the sheet member 20, the top sheet 13 is distorted under the pressure of the marker pen as shown in FIG. 9, causing the resistor films 13b and 12b of the sheets 13 and 12 to be in contact, and thereby generating an electric signal.

Figure 10:
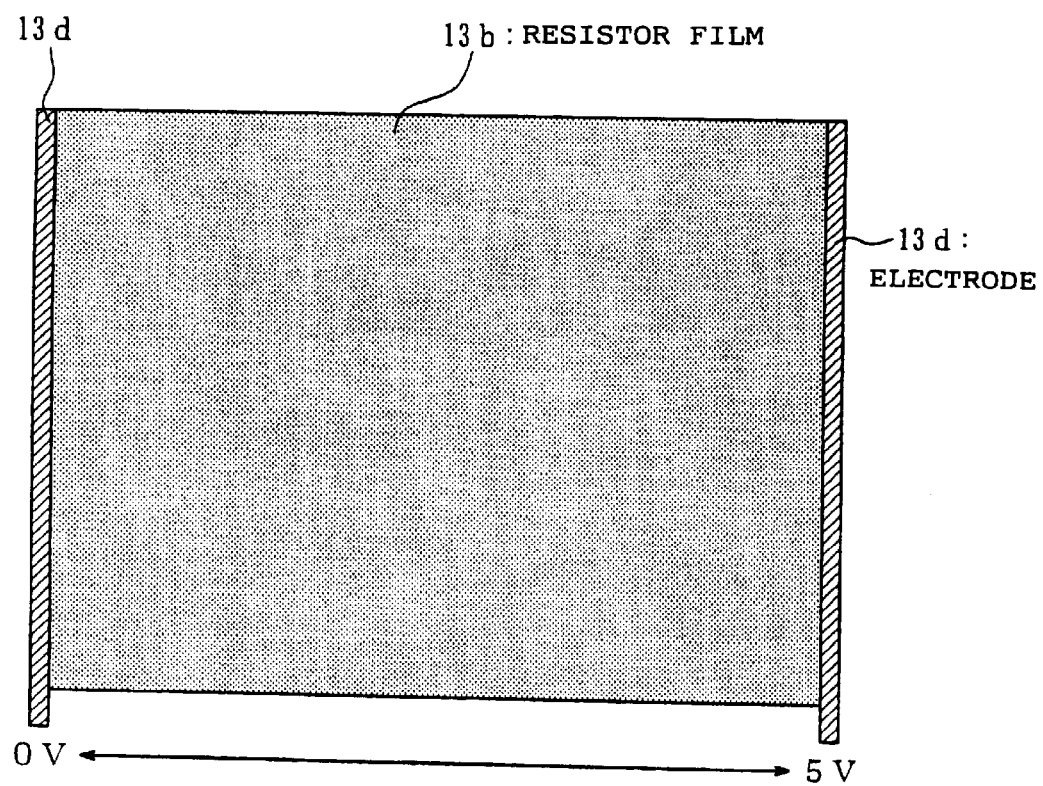
FIG. 10 is an explanatory diagram of a top sheet of the first embodiment.

Referring to FIG. 10, electrodes 13d are formed on both side edges of the resistor film 13b of the top sheet 13, and 0 V and 5 V supplies are respectively fed to the two electrodes. A voltage difference having a constant gradient occurs between both electrodes. Specifically, the potential between the left-hand electrode 13d at 0 V and the right-hand electrode 13d at 5 V changes in proportion to the distance from the left-hand electrode 13d.

Figure 11:
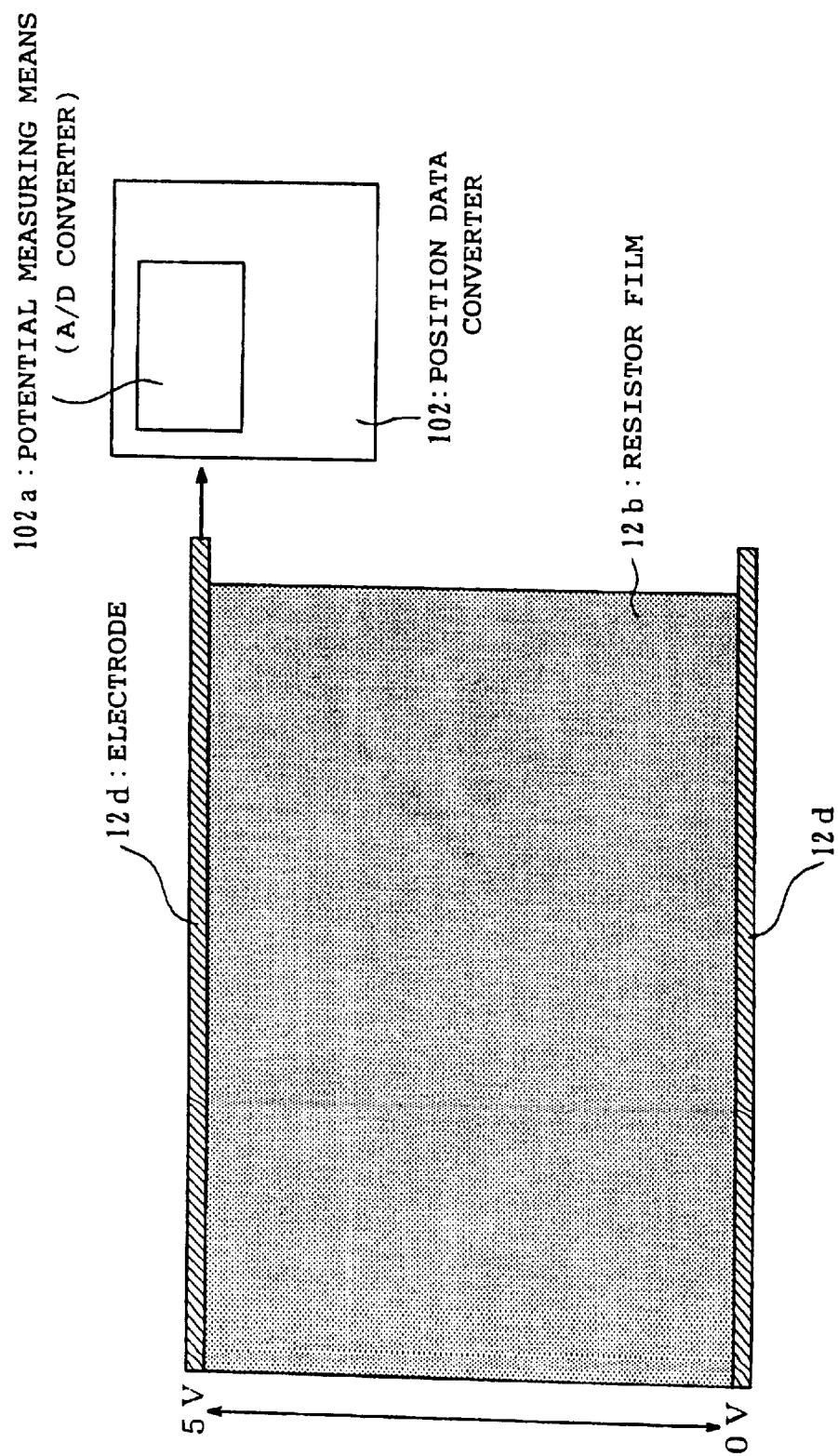
FIG. 11 is an explanatory diagram of a bottom sheet of the first embodiment.

Similarly, referring to FIG. 11, electrodes 12d are formed on upper and lower edges of the resistor film 12b of the bottom sheet 12. To detect a position in a horizontal direction, the lower electrode is opened with no voltage applied, and the upper electrode 12d is connected to potential measuring means 102a (e.g. an A/D converter) in the position data converter means 102.

The detection of the position pressed by the marker pen is carried out as follows. When no pressure is applied on the information input surface, no potential is applied at all to the potential measuring means 102a. When the resistor films 12a and 13a of the sheets 12 and 13 are put into contact when the information input surface is pressed, a potential in response to the point of contact in the horizontal direction is input to the potential measuring means 102a via the bottom sheet 12. In this way, the presence or absence of contact between the resistor films 12a and 13a and the position of point of contact in the horizontal direction are thus detected.

If the top sheet 13 is configured as in the above-described connection of the bottom sheet 12, with the bottom sheet 12 configured as in the above-described top sheet 13, to interchange the top sheet 13 and bottom sheet 12 in their functions, the same principle applies, permitting the presence or absence of contact and the position of point of contact in the vertical direction to be detected.

By alternately detecting the position of point of contact in the horizontal direction and the vertical direction at a high speed, the position coordinates of the point of pressure input is successively tracked, and these are interpolated to form a continuous line. The stroke along the points is thus recognized as a line.

The position data converter means 102 converts the captured analog input data into digital data, which is then output to the data transfer device 103 as the position coordinates of the line or point.

The output signal of the data transfer device 103 is fed to the personal computer 104 via a serial port. The personal computer 104 displays the information input to the sheet member 20, stores it in memory, and prints it out, as necessary. The personal computer 104 may further transmit the data to another personal computer at a remote place.

Figure 12:
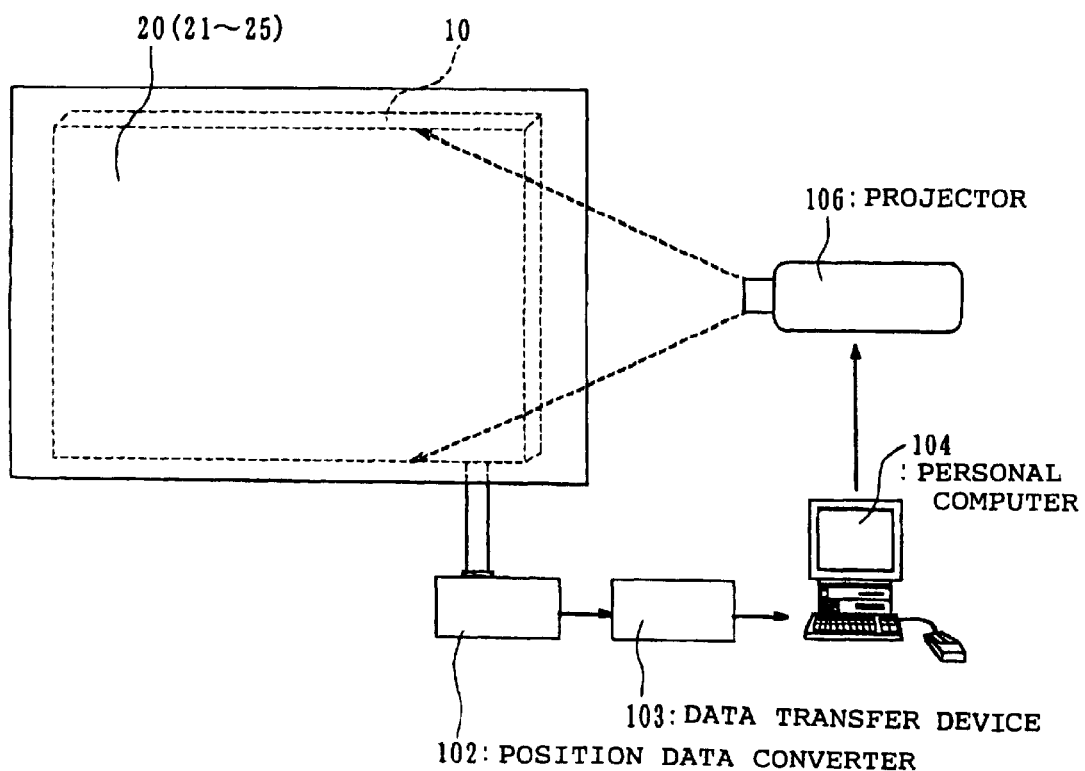
FIG. 12 is a block diagram of a second embodiment of the present invention.

A second embodiment of the present invention is now discussed referring to FIG. 12. Referring to FIG. 12, there is shown a sheet member 20 having a single information input surface. In the second embodiment, again, as in the first embodiment, sheet members 21–25 having a plurality of information input surfaces may be employed.

Figure 17:
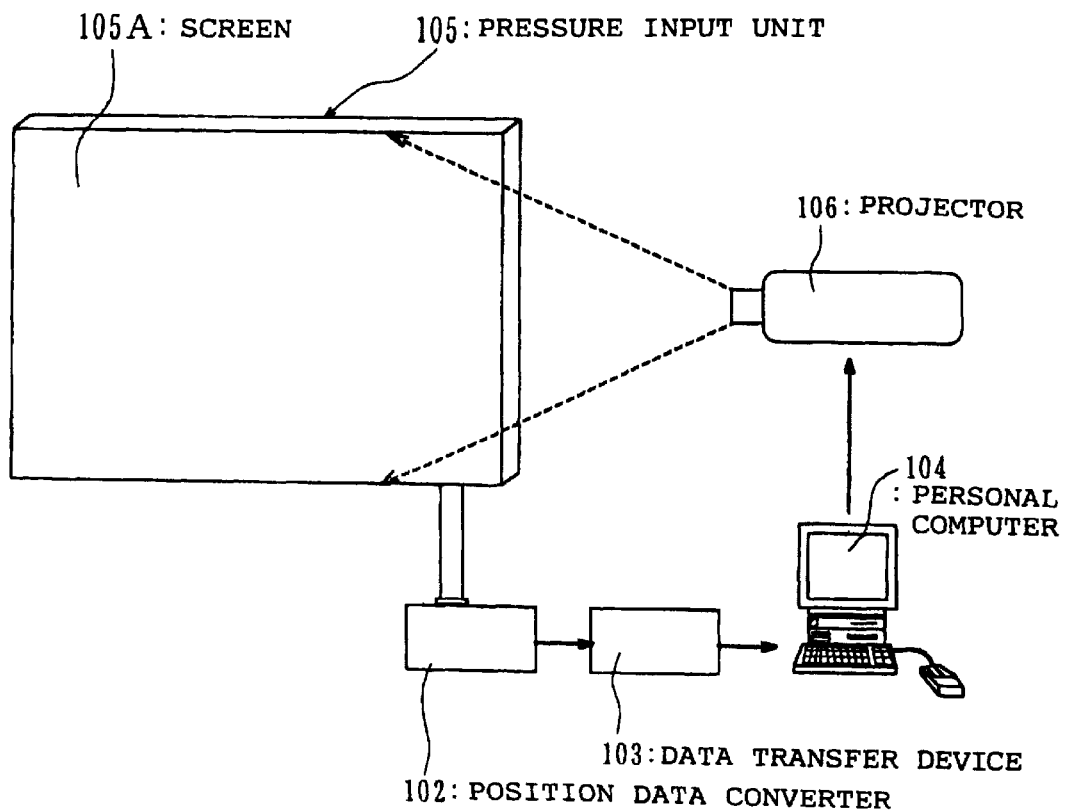
FIG. 17 is a block diagram of another conventional art.

In this embodiment, the sheet member 20 is employed as a screen for image projection, and its entire system generally corresponds to the display system shown in FIG. 17.

The sheet member 20 needs no writing nor erasing function, and is constructed of the same material as that of the screen 105A shown in FIG. 17, for example, and is separately arranged in front of the position coordinate detecting means 10. The structure of the position coordinate detecting means 10 remains identical to any of those shown in FIG. 8 through FIG. 11.

In this embodiment, the information input onto the sheet member 20 by a pressure pen is transmitted to the personal computer 104 via the position data converter means 102 and data transfer device 103. The personal computer 104 monitors the written information on its monitor, while transmitting at the same time the written information to a projector 106, such as a liquid-crystal projector, for example connected to a monitor connection terminal to project the written information onto the sheet member 20.

In this way, information projected takes exactly the same stroke as the pressure pen takes on the sheet member 20 and this gives viewers the impression that the information is actually written on the sheet member 20.

Figure 13:
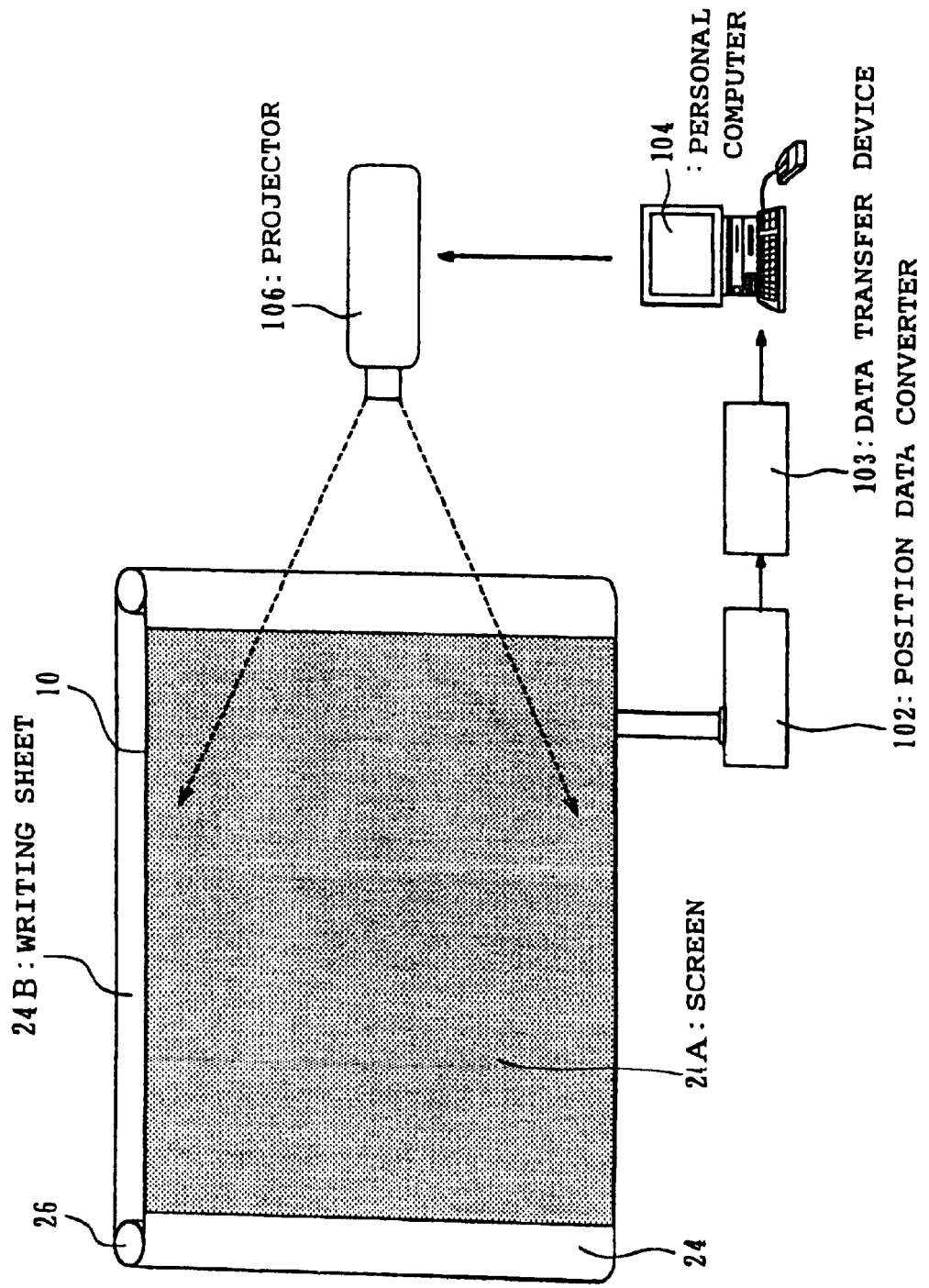
FIG. 13 is a block diagram of a third embodiment of the present invention.

FIG. 13 shows a third embodiment of the present invention. In this embodiment, an endless sheet member 24 is entrained about a pair of rollers 26 and is divided into two surfaces, with its front surface used as a screen 24A and its rear surface used as a writing and erasing sheet 24B written (and erasable) by the marker pen. This display system is provided with the functions of the first embodiment shown in FIG. 7 and of the second embodiment shown in FIG. 12. The sheet member 24 is constructed by splicing the film of the screen 24A to the writing sheet 24B.

When an image, pressure input onto the screen 24A, is projected in this embodiment, the display system is used as shown in FIG. 13. When the display system is used as an electronic blackboard, the writing sheet 24B is turned frontward by rotating the rollers 26.

According to this embodiment, an electronic blackboard and an image projection system are incorporated into a single apparatus.

Figure 1:
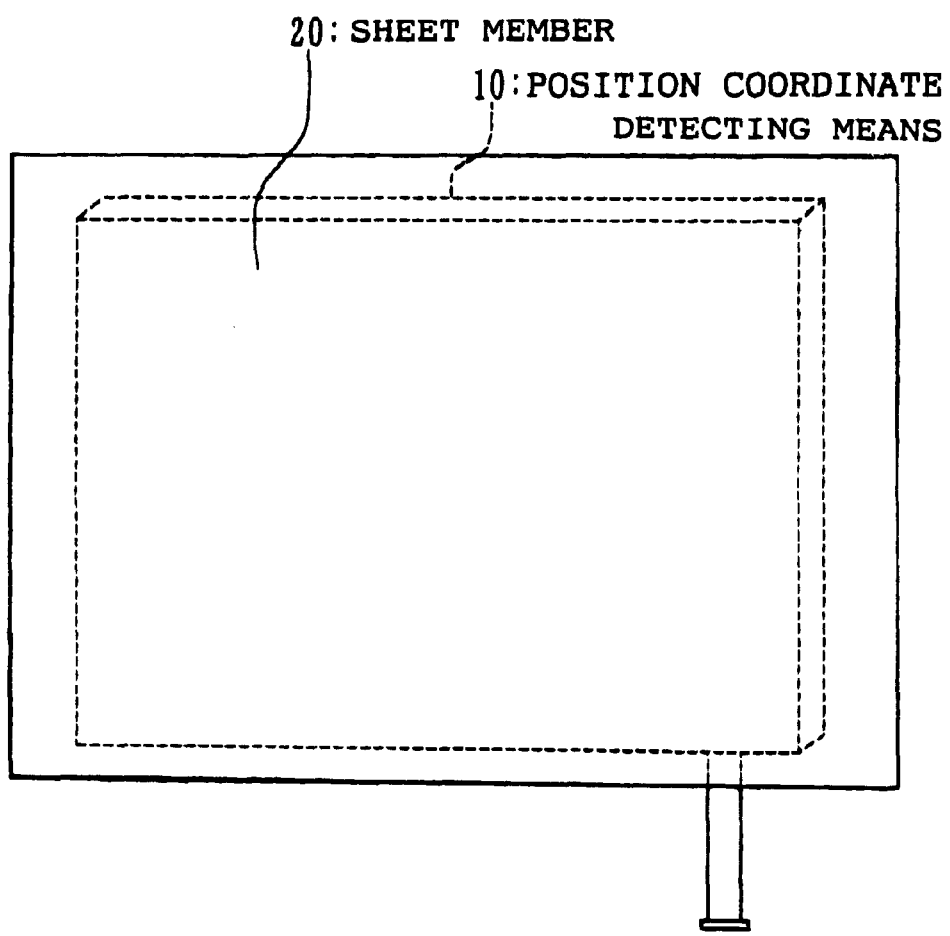
FIG. 1 is an explanatory diagram of a sheet member and position coordinate detecting means of the present invention.
Figure 2:
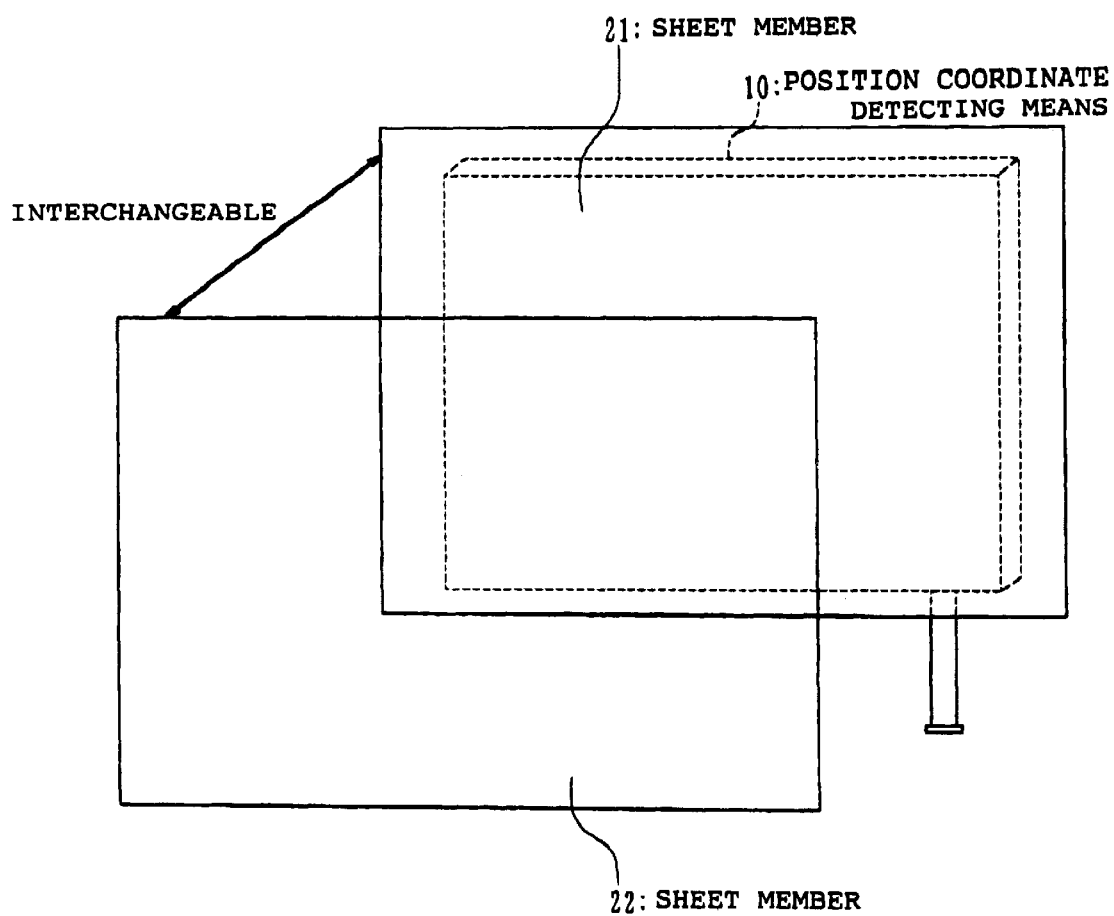
FIG. 2 is an explanatory diagram of a sheet member and position coordinate detecting means of the present invention.
Figure 3:
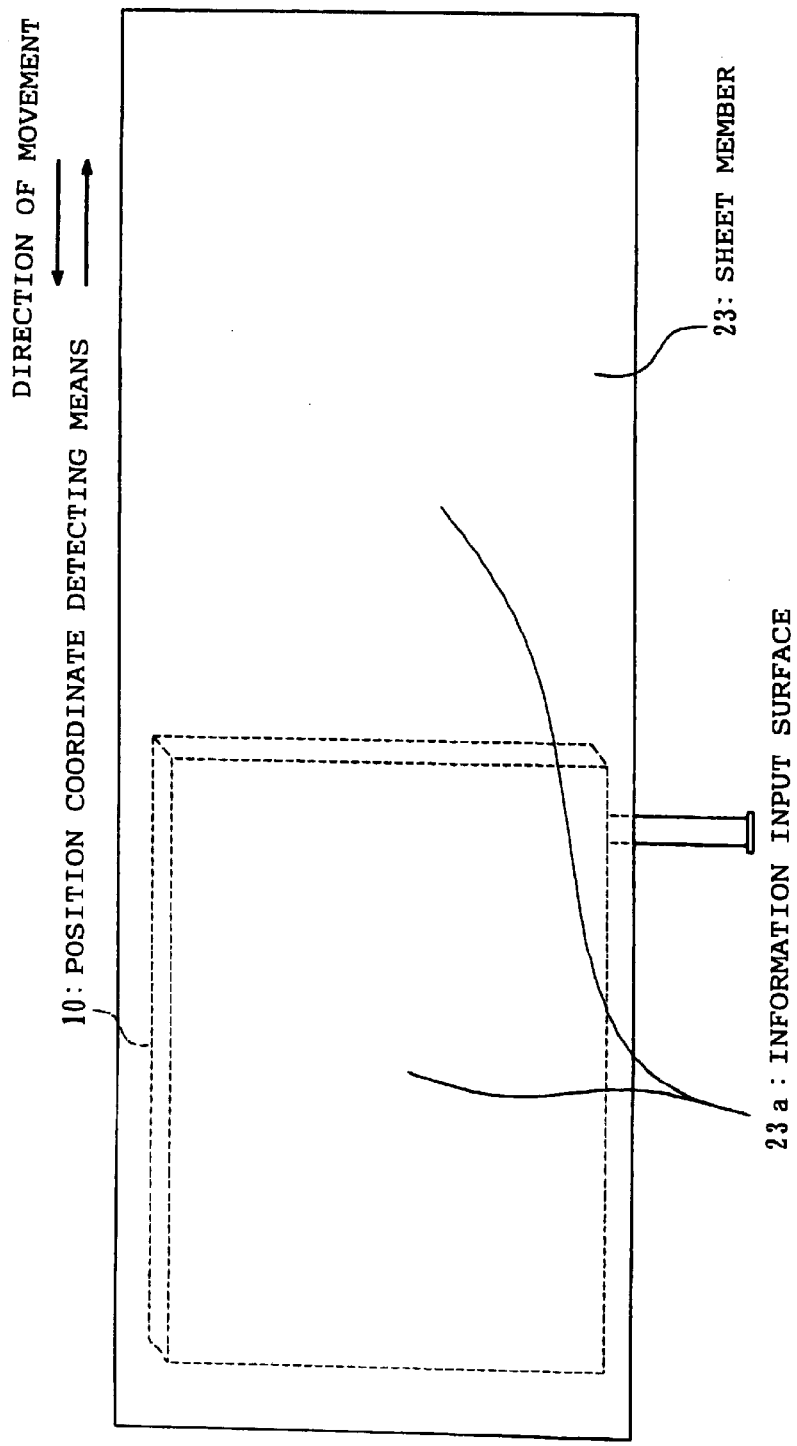
FIG. 3 is an explanatory diagram of a sheet member and position coordinate detecting means of the present invention.
Figure 4:
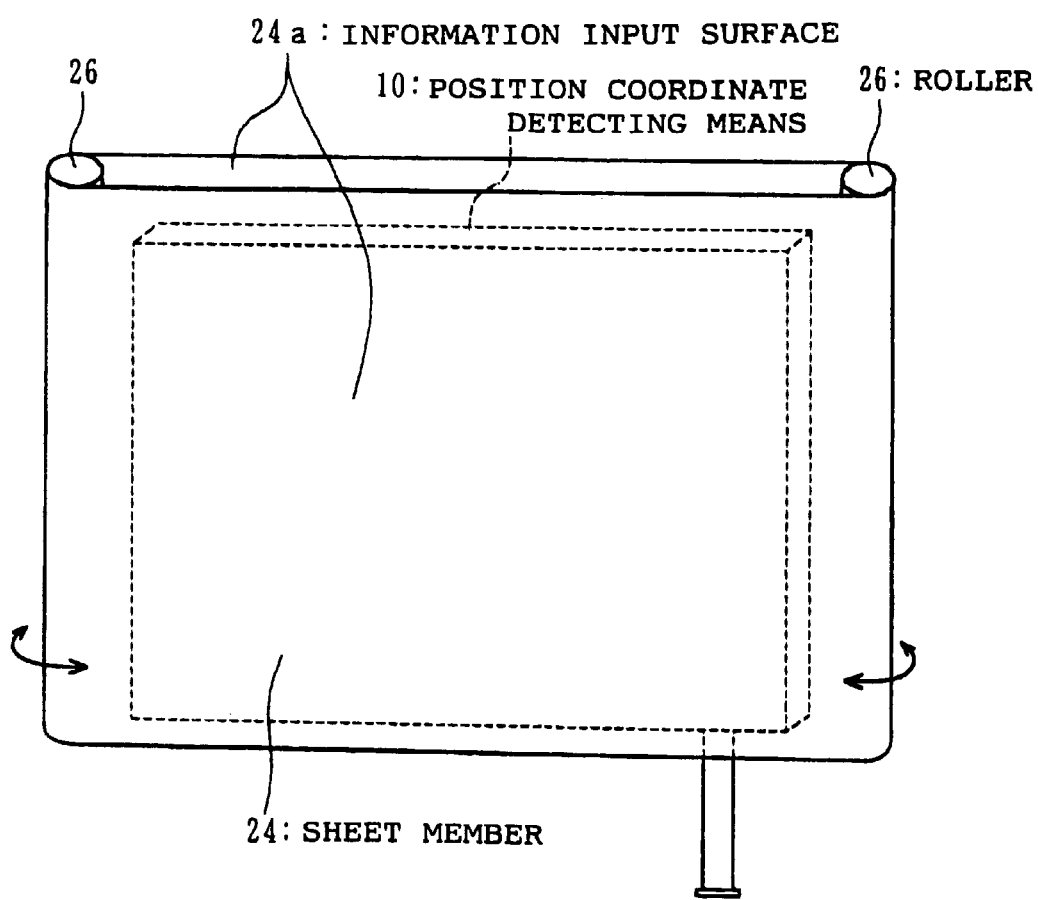
FIG. 4 is an explanatory diagram of a sheet member and position coordinate detecting means of the present invention.
Figure 5:
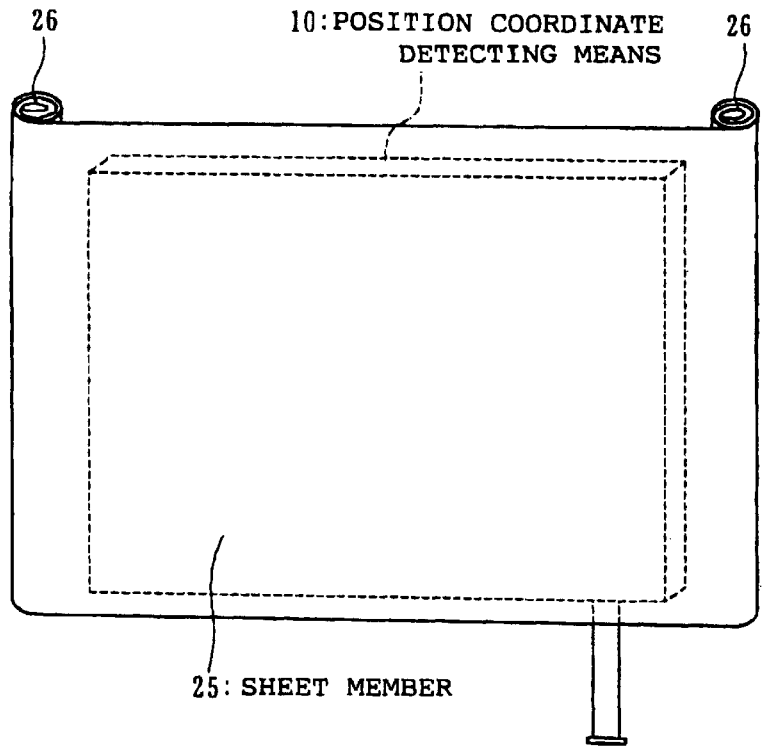
FIG. 5 is an explanatory diagram of a sheet member and position coordinate detecting means of the present invention.
Figure 6:
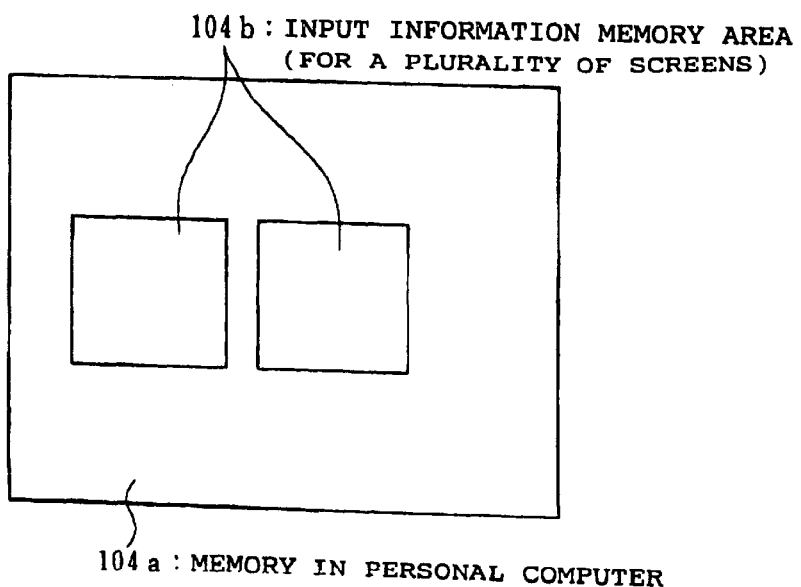
FIG. 6 is an explanatory diagram of input information memory areas in a personal computer according to the present invention.

The principle, in this embodiment, of using a plurality of information input surfaces with one information input surface used for a writing sheet and the other information input surface used for a screen applies to the sheet members 21–23 and 25, respectively, shown in FIG. 2, FIG. 3, and FIG. 5.

Figure 14:
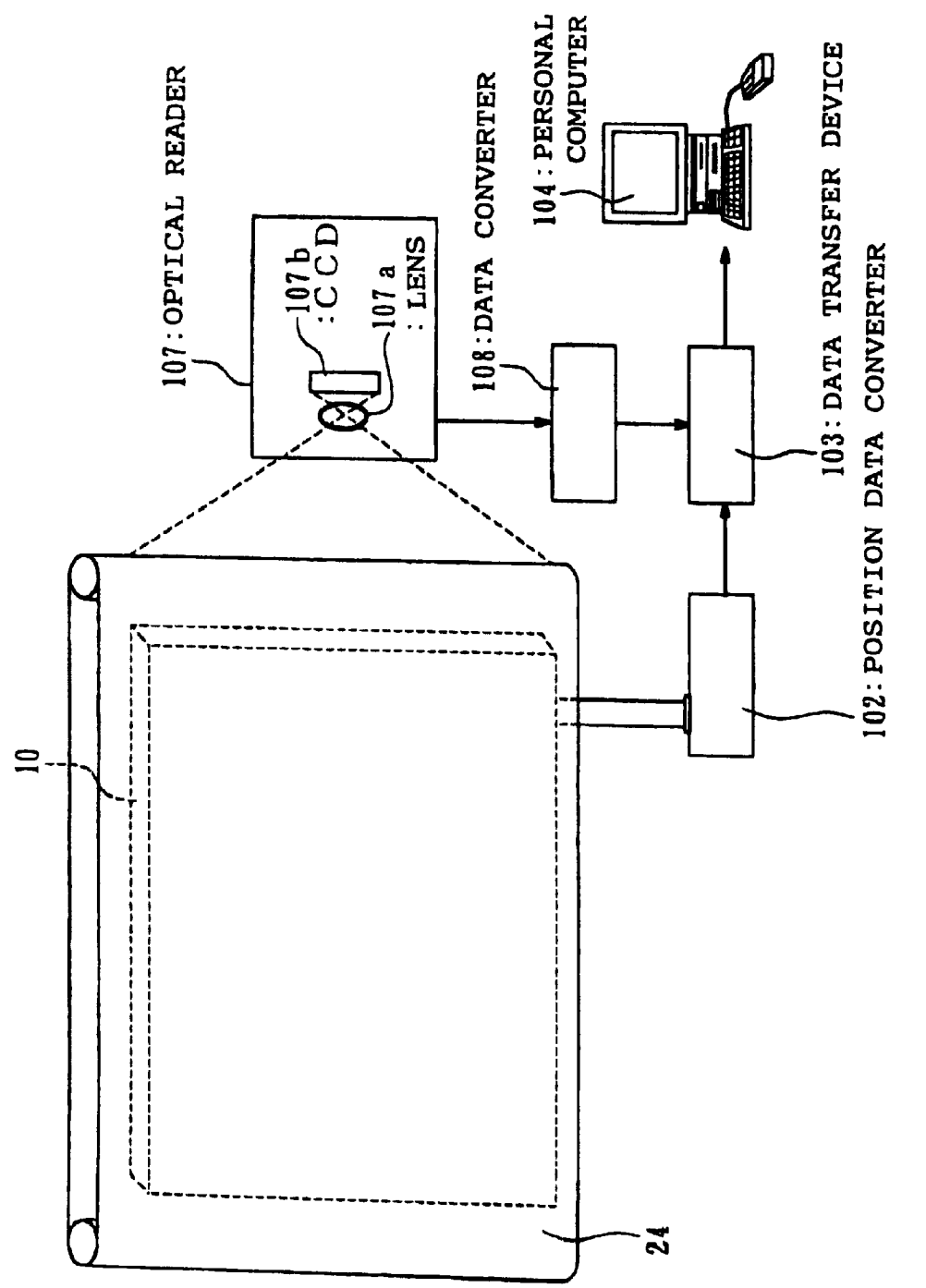
FIG. 14 is a block diagram of a fourth embodiment of the present invention.

FIG. 14 shows a fourth embodiment of the present invention.

Besides the electronic blackboard of the present invention, this embodiment further includes an optical reader 107 for optically reading written information, and data converter 108 for converting the read data into digital data to transmit it to the personal computer 104.

In this embodiment, the position coordinate detecting means 10 recognizes the information written on the sheet member 24. Furthermore, a light ray from an unshown light source is directed to the written information and a lens 107a and CCD 107b in the optical reader 107 detect the light ray reflected from the written information or the light ray transmitted through the written information to read the written information. The present invention applies to the electronic blackboard including one of the sheet members 23 and 25 shown in FIG. 3 and FIG. 5.

The written information reader and display system, including the position coordinate detecting means 10, position data converter 102, data transfer device 103 and personal computer 104, is useful for presenting the input information on a monitor or the like substantially on a real time basis. Depending on the situation in a conference, conference participants may want a hardcopy.

With the optical reader 107 added to the conventional electronic blackboard as shown in FIG. 14, the written information is read with the sheet member 24 shifted, in time of need. The read information is sent via the data converter 108 and data transfer device 103 to the personal computer 104, which in turn outputs its hardcopy and presents it on the monitor.

In the embodiment shown in FIG. 14, the data transfer device 103 for position coordinate data is also used to transmit the optically read data. In a sense, the data transfer device 103 is used in a time division manner, and utilization of the apparatus is thus heightened.

Since the sheet member is formed of a body separate from the position coordinate detecting member as described above, according to the present invention, a slight gap is formed between the sheet member and the position coordinate detecting member. For this reason, the resistor film of the position coordinate detecting means is not seen through the sheet member. The present invention thus provides a display system that frees the viewers from the irritation of the resistor film. With this arrangement, the sheet member is not required to be thick enough to prevent the resistor film from being seen through, and the pen is easy to use because a force the pen needs to exert during information input is light.

Since the sheet member has a plurality of information input surfaces, the information already input onto the sheet member is re-presented for reviewing a previous issue once finished. The information already input may be easily modified, or further information may be easily added. A conference is thus flexibly conducted.

Rather than sharing a single material sheet member for a writing sheet and for a projection screen, an optimum surface-treated writing sheet and an optimum surface-treated screen may be formed on a single but partitioned sheet. This arrangement fully takes advantage of the functions of the electronic blackboard and the projection system.

The present invention is used as an electronic-blackboard type display system which transfers information, written on an information input surface of a sheet member with a marker pen or the like, to a personal computer substantially concurrently with the writing of the information to present the information on a monitor, to store the information in a memory, and to print out the information on a printer. The present invention is also used as a display system which transfers information, input through pressure with a pressure pen on the sheet member used as a projection screen, to the personal computer while projecting the input information on the screen through a projector connected to the personal computer.

What is claimed is:

1. An electronic-blackboard type display system comprising:
   a sheet member onto which information is input;
   position coordinate detecting means, formed as a body separate from the sheet member and arranged behind the sheet member, for detecting a position of information input on the sheet member; and
   control means, to which output data of the position coordinate detecting means is transferred, for processing the information input to the sheet member, wherein the position coordinate detecting means includes a resistor film type, pressure sensitive touch panel and wherein the sheet member prevents the resistor film type, pressure sensitive touch panel from being seen by viewers viewing the electronic-blackboard type display system,
   wherein the sheet member includes a plurality of information input surfaces.

2. An electronic-blackboard type display system according to claim 1, wherein the position coordinate detecting means detects, as the position of information input, a position where a pressure is applied on the sheet member.

3. An electronic-blackboard type display system according to claim 1, wherein the sheet member includes a writing sheet onto which a writing and pressure pen writes information.

4. An electronic-blackboard type display system according to claim 1, wherein the sheet member includes a screen onto which a pressure pen inputs information and onto which an image, based on the output data of the position coordinate detecting means, is projected.

5. An electronic-blackboard type display system according to claim 1, wherein the sheet member includes an information input surface, as a writing sheet onto which a writing and pressure pen writes information, and an information input surface, as a screen onto which an image, based on the output date of the position coordinate detecting means, is projected.

6. An electronic-blackboard type display system according to claim 1, wherein the control means includes a plurality of memory areas corresponding to a plurality of information input surfaces of the sheet member.

7. An electronic-blackboard type display system according to claim 1, further comprising position data converter means for converting the output data of the position coordinate detecting means into digital position coordinate data; and, data transfer means for transferring the output data of the position data converter means to the control means.

8. An electronic-blackboard type display system according to claim 3, further comprising position data converter means for converting the output data of the position coordinate detecting means into digital position coordinate data; and
   data transfer means for transferring the output data of the position data converter means to the control means.

9. An electronic-blackboard type display system according to claim 4, further comprising position data converter means for converting the output data of the position coordinate detecting means into digital position coordinate data; and data transfer means for transferring the output data of the position data converter means to the control means.

10. An electronic-blackboard type display system according to claim 5, further comprising position data converter means for converting the output data of the position coordinate detecting means into digital position coordinate data; and data transfer means for transferring the output data of the position data converter means to the control means.

11. An electronic-blackboard type display system according to claim 6, further comprising position data converter means for converting the output data of the position coordinate detecting means into digital position coordinate data; and data transfer means for transferring the output data of the position data converter means to the control means.

12. An electronic-blackboard type display system according to claim 5, further comprising optical reader means for optically reading information written onto the sheet member;

data converter means for converting the output data of the optical reader means into digital data; and data transfer means for transferring the output data of the data converter means to the control means.

13. An electronic-blackboard type display system according to claim 5, further comprising optical reader means for optically reading information written on the sheet member;

data converter means for converting the output data of the optical reader means into digital data; and data transfer means for transferring the output data of the data converter means to the control means.

14. An electronic-blackboard type display system comprising:

a sheet member onto which information is input, including a screen onto which a pressure pen inputs information;

position coordinate detecting means, formed as a body separate from the sheet member and arranged behind the sheet member, for detecting a position of information input on the sheet member; and control means, to which output data of the position coordinate detecting means is transformed for processing the information input to the sheet member, from which image data, based on the output data of the position coordinate detecting means, is projected as an image onto the screen.

15. An electronic-blackboard type display system according to claim 14, wherein the position coordinate detecting means detects, as the position of information input, a position where a pressure is applied on the sheet member.

16. An electronic-blackboard type display system according to claim 14, wherein the position coordinate detecting means includes a resistor film type, pressure sensitive touch panel.

17. An electronic-blackboard type display system according to claim 14, wherein the sheet member includes a plurality of information input surfaces.

18. An electronic-blackboard type display system according to claim 17, wherein the control means includes a plurality of memory areas corresponding to a plurality of information input surfaces of the sheet member.

19. An electronic-blackboard type display system comprising:

a sheet member onto which information is input, including an information input surface, as a writing sheet onto which a writing and pressure pen writes information, and an information input surface, as a screen;

position coordinate detecting means, formed as a body separate from the sheet member and arranged behind the sheet member, for detecting a position of information input on the sheet member; and control means, to which output data of the position coordinate detecting means is transferred for processing the information input to the sheet member, from which image data, based on the output data of the position coordinate detecting means, is projected as an image onto the screen.

20. An electronic-blackboard type display system according to claim 19, wherein the position coordinate detecting means detects, as the position of information input, a position where a pressure is applied on the sheet member.

21. An electronic-blackboard type display system according to claim 19, wherein the position coordinate detecting means includes a resistor film type, pressure sensitive touch panel.

22. An electronic-blackboard type display system according to claim 19, wherein the sheet member includes a plurality of information input surfaces.

23. An electronic-blackboard type display system according to claim 22, wherein the control means includes a plurality of memory areas corresponding to a plurality of information input surfaces of the sheet member.

* * * * *